United States Patent [19]
Arkles et al.

[11] Patent Number: 4,970,263

[45] Date of Patent: Nov. 13, 1990

[54] SECONDARY CROSS-LINKED SEMI-INTERPENETRATING POLYMER NETWORKS AND METHODS OF MAKING SAME

[76] Inventors: Barry C. Arkles; Robert A. Smith, both of c/o Petrarch Systems Inc., 2570 Pearl Buck Rd., Bristol, Pa. 19007

[21] Appl. No.: 134,732

[22] Filed: Dec. 18, 1987

Related U.S. Application Data

[63] Continuation-in-part of Ser. No. 577,113, Feb. 6, 1984, Pat. No. 4,714,739, which is a continuation-in-part of Ser. No. 370,000, Feb. 6, 1984, Pat. No. 4,500,688.

[30] Foreign Application Priority Data

Apr. 20, 1983 [DE] Fed. Rep. of Germany ....... 3314355

[51] Int. Cl.$^5$ .......................... C08L 83/05; C08L 9/00
[52] U.S. Cl. ....................................... 525/92; 525/101; 525/105; 525/106; 525/342; 525/431; 525/453; 525/455
[58] Field of Search .................. 525/92, 101, 105, 106, 525/342, 431, 453, 455

[56] References Cited

U.S. PATENT DOCUMENTS

| | | | |
|---|---|---|---|
| 4,500,688 | 10/1984 | Arkles | 525/431 |
| 4,714,739 | 12/1987 | Arkles | 525/106 |

FOREIGN PATENT DOCUMENTS 0073715  6/1980  Japan .................. 525/101

*Primary Examiner*—John C. Bleutge
*Assistant Examiner*—R. Dean, Jr.

[57] ABSTRACT

Silicone semi-interpenetrating polymer networks are formed in thermoplastic polymer matrices by the vulcanization of a hydride group-containing silicon with a polymer containing unsaturated groups. The semi-IPN is then cross-linked by hydrolysis of SiOR groups on the polymer network, so that the OR groups are hydrolyzed to allow condensation of silanol groups to form SiOSi cross-links between the chains of the polymer network. Preferably, the polymer containing unsaturated groups in an alkoxysilyl-modified poly 1,2-butadiene. The resulting cross-linked products have improved chemical resistance, increased compressive or tensile strength and excellent temperature resistance and electrical properties for use in applications such as papermaking felts and wire and cable insulation.

25 Claims, No Drawings

SECONDARY CROSS-LINKED SEMI-INTERPENETRATING POLYMER NETWORKS AND METHODS OF MAKING SAME

CROSS-REFERENCE TO RELATED APPLICATIONS

This application is a continuation-in-part of co-pending U.S. application Ser. No. 577,113 of Barry C. Arkles, filed Feb. 6, 1984 for "Curable Silicone Semi-Interpenetrating Polymer Networks and Methods of Making Same," now U.S. Pat. No. 4,714,739, which in turn is a continuation-in-part of U.S. application Ser. No. 370,000 filed Feb. 6, 1984 for "Curable Silicone Containing Compositions and Methods of Making Same," now U.S. Pat. No. 4,500,688. Application Ser. No. 577,113 also claims priority from German patent application No. P 33 14 355.2, filed April 20, 1983.

FIELD OF THE INVENTION

The present invention relates to silicone semi-interpenetrating polymer networks having secondary cross-links between the polymer chains. More particularly, the invention relates to the formation of SiOSi cross links between semi-interpenetrating polymer networks.

BACKGROUND OF THE INVENTION

Interpenetrating polymer networks are described, for example, by L. H. Sperling in *Interpenetrating Polymer Networks and Related Materials*, Plenum Press, New York and London (1981). A full or true interpenetrating polymer network (IPN) is a material containing two polymers, each in network form, with the two polymers having been polymerized or vulcanized independently in the presence of each other to form two networks which are intertangled (interpenetrated) with each other. The IPNs may be formed in different manners, with the synthesis (polymerization) and/or cross-linking (vulcanization) of the two polymers being sequential or simultaneous. Another mode of IPN synthesis involves simultaneous coagulation and cross-linking of two latex polymers to form an interpenetrating elastomeric network.

One type of IPN system is illustrated in U.S. Pat. No. 4,302,553 of Frisch et al. IPNs of this sort invlove a blend of two different prepolymers cross-linked in independent processes and permanently entangled with one another. These IPNs are thermoset in character.

Semi- or pseudo-IPNs have only one cross-linked phase or network which is within a continuous unlinked polymer matrix phase. It is possible with certain solvent soluble resins to extract this non-cross-linked phase, whereas that is not possible for the true IPN. As a result, the true IPN systems must be cast since once the components are admixed and the polymer formation takes place, the interpenetrating networks cannot be separated. The single cross-linked network of the semi-IPNs allows these materials to retain thermoplastic character, although semi-IPNs with thermosetting properties are also possible.

U.S. Pat. Nos. 4,500,688 and 4,713,739 disclose silicone systems which are vulcanized within a thermoplastic matrix to form semi-interpenetrating polymer networks which are either pure silicone polymers or hybrids of a silicone polymer and a non-silicone (e.g., vinyl) polymer. These silicone semi-IPNs provide surface and dielectric properties which approach those of silicones without significantly decreasing the mechanical properties of the thermoplastic matrix in which they are formed. Thus, the matrix thermoplastic is essentially unaffected by the vulcanization of the silicone network. However, it would be desirable if silicone semi-IPNs could be formed which actually improve certain mechanical properties of the thermoplastic matrix, particularly tensile or compressive strength.

BRIEF SUMMARY OF THE INVENTION

According to the invention, polymeric compositions are formed with a thermoplastic polymer matrix and a cross-linked silicone semi-interpenetrating polymer network within the matrix. The network is formed by two distinct reactions within the matrix, one reaction being the vulcanization of a hydride group-containing silicone with a polymer, preferably a vinyl polymer, containing at least one unsaturated group to form a semi-IPN. This reaction is usually catalyzed with a platinum catalyst.

The second reaction involves the hydrolysis of SiOR groups on IPN polymer network (either from the hydride group-containing silicone or from the polymer containing the unsaturated group), where OR represents a hydrolyzable group, typically an alkoxy group. After carrying out the vulcanization during thermoplastic melt-processing, the semi-IPN in the thermoplastic matrix is immersed in water or steam, causing hydrolysis of the OR groups and condensation of the resulting silanol (OH) groups to form SiOSi cross-links between the chains of the polymer network. Preferably, the semi-IPN is dried with heat prior and subsequent to the water or steam immersion.

DETAILED DESCRIPTION OF THE PREFERRED EMBODIMENTS

The compositions of this invention are formed by the catalyzed curing or vulcanization of a silicone in a compatible polymeric thermoplastic matrix at elevated temperature, followed by hydrolytic cross-linking of the semi-IPN polymer chains. A silicone is any of a large group of siloxane polymers based on a structure comprising alternate silicon and oxygen atoms with various organic radicals attached to the silicon.

The amount of silicone network in the resultant compositions of the present invention can range from about 1 weight percent to about 60 weight percent.

Vulcanization (curing) can be defined as any treatment that decreases the flow of an elastomer, increases its tensile strength and modulus, but preserves its extensibility. These changes are generally brought about by cross-linking reactions between polymer molecules, but for purposes of this invention, vulcanization is used in a broader sense to include chain extension as well as cross-linking reactions.

The polymeric thermoplastic matrices of this invention include conventional thermoplastic resins including, but not limited to polyamides (e.g., nylon), thermoplastic polyurethanes, bisphenol A polycarbonates, styrene-ethylene-butylene-styrene (SEBS) block copolymers, polyolefins, polyacetals, styrene-butadiene copolymers, polyolefin elastomers, polyamide-polyether elastomer base resins, etc.

In one embodiment of this invention, a two-part vulcanization silicone which, depending on molecular structure, will undergo predominantly chain extending or cross-linking reactions, is vulcanized in a suitable thermoplastic matrix. One polymeric silicone component of the two part silicone silicone hydride (Si—H)

groups. The other polymeric component contains unsaturated groups, preferably vinyl. Non-limiting examples of other unsaturated groups that can be employed include allyl-$CH_2CH=CH_2$ and hexenyl-$(CH_2)_4CH=CH_2$. Alternatively, both the hydride and unsaturated groups can be part of one polymeric silicone.

In the presence of a catalyst, generally a platinum complex, silicon hydride adds to the unsaturated group, e.g., a vinyl group, to create an ethylene linkage as follows:

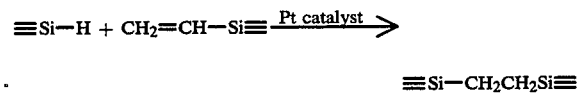

The principles of this chemistry are well-known to those skilled in the art. This chemistry is adapted in a number of ways for specific polymer systems. The substituents are varied to achieve an appropriate degree of compatibility with the matrix resin. The molecular weight and amount of reactive groups are varied in order to achieve the desired cross-link density. Finally, the ratio of silicone to matrix polymer is varied.

In another embodiment, the silicone component of the compositions of the invention may be hybrid silicones instead of pure silicones. These hybrids may be formed by the reaction of a hydride-containing silicone with a vinyl polymer (or other unsaturated group-containing polymer) which is not a silicone or siloxane polymer. Examples of such unsaturated group-containing polymers include styrene, butadiene and urethane polymers and copolymers, such as styrene-butadiene copolymers, butadiene-urethane copolymers, SEBS (styrene-ethylene-butylene-styrene) block copolymers, polybutene oil, etc. The urethane component of butadiene-urethane copolymers may be formed in situ in the thermoplastic matrix.

Where a butadiene polymer or copolymer is used as the source of unsaturated groups, it is preferred that the polymer or copolymer contain a significant proportion of poly 1,2-butadiene units. Thus, better reaction is obtained with the hydride groups where the vinyl groups extend from the polymer chain than where the vinyl groups are in the polymer chain, such as is the case with poly 1,4-butadiene. When calculating the ratios of hydride groups to vinyl groups, as discussed above, it is therefore necessary in the case of polybutadiene where there are both 1,4 and 1,2 vinyl groups to calculate the stoichiometric proportions on the basis of the amount of 1,2 butadiene in the polymer or copolymer. In the case of polybutene oil, there is one double bond at the chain terminus which can react with the hydride of the silicone.

To allow for the second (hydrolysis) reaction of the invention, OR (typically alkoxy) modified polymers are preferably used as the source of vinyl or unsaturated groups. For example, triethoxysiyl modified poly 1,2 butadiene is preferably used to provide the hydrolyzable groups which can yield the SiOSi cross-links. In this modified polymer, some of the bonds of the poly 1,2 butadiene will have $Si(OCH_2CH_3)_3$ groups along the polymer chain, and other 1,2 vinyl groups will react with the hydride functional silicone. Alternatively, the hydrolyzable OR groups may be on the hydride group-containing siilicone, though such compounds are not as preferred. Similarly, though not as preferred, the OR groups may be, for example, acyloxy or aryloxy groups. However, the hydrolysis reaction then results in acid or phenol by-products which are often undesirable.

Vinyl-containing polymers that can be employed in the present invention have viscosity ranges of about 200 ctsk to about 3,000,000 ctsk and preferably about 500 to about 100,000 ctsk, with polymers having viscosities of between about 1,000 and about 65,000 ctsk being particularly preferred. Hydride-containing polymers that can be utilized in the present invention have viscosities of about 15 ctsk to about 30,000 ctsk, with a preferred viscosity range of about 500 ctsk to about 1,000 ctsk. Molecular weights are correlated to viscosity. Thus a vinyl terminated polymer having a viscosity of 1,000 ctsk has a molecular weight of about 28,000.

In one embodiment of this invention, pellets are formed of the compositions of this invention. These pellets can be readily utilized for injection molding or extrusion. The pellets may either contain silicones which have been vulcanized or contain all the materials necessary to form the vulcanizate during injection molding or extrusion.

In this embodiment, reactive silicone components are confined to separate solid pellets of matrix resin (e.g. urethane). The pellets are handled as a homogeneous mix. Upon entering the melt state in conventional injection molding or extrusion equipment, the confinement of reactive silicones to individual pellets collapses, and they begin to react with each other forming a semi-interpenetrating polymer network. While it is essential that the reaction is initiated in the melt, it will proceed in the solid state. Within two to three hours of entering the melt state, the property development associated with the formation of the semi-IPN is substantially complete. Little or no difference between this processing and conventional resin processing during extrusion or injection molding is observed.

The silicones of this invention will generally undergo one of two types of mechanisms—namely, chain-extension or cross-linking. The silicones which during vulcanization undergo primarily chain-extension yield thermoplastic components (plastics capable of being repeatedly softened by increases in temperature and hardened by decreases in temperature), although the secondary SiOSi cross-link ultimately yields compositions with thermosetting properties. Silicones which undergo primarily cross-linking during vulcanization yield compositions that have thermosetting properties (resins which cure by chemical reaction when heated and, when cured, cannot be resoftened by heating).

In the case of the predominantly chain-extension vulcanizations of this invention, a thermoplastic resin is combined with silicone components including a hydride-containing silicone and an unsaturated group-containing (e.g., vinyl) polymer. The vinyl polymer generally contains from about two to about four vinyl groups, preferably with two such groups in terminal positions. The hydride-containing silicone contains 1 to 2 times the equivalent of the vinyl functionality. The two silicones are mixed in a ratio so that the hydride groups to vinyl groups is between about 1.2:1 and about 6:1.

Theoretically only a 1:1 ratio is necessary, but it has been found that a higher ratio as indicated above is often required. The silicone hydride polymers are not as stable as most vinyl polymers. In the presence of amines or hydroxyls, the silicone hydrides can react and liberate hydrogen thus yielding $SiN=$ or $Si-OR$. Thus the simplest practical solution to this problem is to maintain hydride levels higher than stoichiometric requirements.

The typical remaining substituents on the silicones are methyl groups. However, in order to insure compatibility with thermoplastic matrix resin, other groups such as phenyl, longer chain alkyl or cyanopropyl groups may replace some of the methyl groups.

A platinum catalyst, preferably derived from chloroplatinic acid is added to the mixture just prior to melt-mixing so that the amount of platinum is equal to 1–15 ppm. One simple catalyst solution which is particularly satisfactory is a 7% solution of chloroplatinic acid in anhydrous ethanol, which may suitably be sprayed on the resin. If desired, a vinyl siloxane may be used to form an active complex with the platinum which is soluble in the silicones to be cross-linked. The mixture is meltmixed by a process such as extrusion and is then pelletized.

A predominantly cross-linked structure in which the resulting composition has thermosetting properties is achieved by extruding the vinyl polymer and hydride-containing silicones separately into two portions of the base polymer. The vinyl-containing polymer contains from about two to about thirty vinyl groups and the hydride-containing silicone contains from two to ten times the equivalent of the vinyl functionality. In this case the hydride functional silicone is the cross-linker since it contains a relatively high number of sites per chain for cross-linking. The relationship of these two materials can, however, be reversed. The ultimate ratio of the vinyl polymer and hydride-containing silicone is adjusted in either case so that the ratio of the hydride groups to the vinyl groups in the composition is between about 1.2:1 and about 6:1.

Once the separate extrusions are prepared, a physical blend of the pellets is made. A platinum catalyst is then tumbled into the mixture. When the pellets are melted together, the vinyl and hydride groups react. Most of the thermosetting reaction takes place during injection molding or extrusion of the mixture and may be completed during a post-cure. A number of permutations of the above will be evident to those skilled in the art. One component pellet could contain for example predominantly vinyl polymer with some of the hydride silicone. In some instances, the two polymers do not have to be isolated prior to melt mixing. In fact, vinyl groups and hydride groups can be on the same silicone chain. Having the materials in separate pellets reduces (or eliminates) surface cure of the pellets. Another solution to this problem would be to use a fugitive inhibitor at the platinum catalyst.

The above formation of a silicone semi-IPN in a thermoplastic matrix is already known from U.S. Pat. Nos. 4,500,688 and 4,714,739. However, the present invention modifies the semi-IPN network by forming a secondary cross-link which gives in effect a three dimensional cross-linked network. This increases the cross-link density using oxane bridges (SiOSi).

The increased cross-link density improves a number of properties of the composition, including chemical resistance, tensile or compressive strength, temperature resistance and electrical properties. The increased compressive strength makes the compositions of the present invention particularly useful, for example, in the production of nylon fiber mats for paper making machines. Thus, nylon fibers incorporating the secondary cross-linked semi-IPNs of the present invention can recover better after being compressed between water expression rollers, while having improved chemical resistance to paper making chemicals. Similarly, the improved temperature and electrical properties of compositions of the present invention can produce better polyethylene tne EPDM-modified insulation materials for wire and cables.

Cross-linking of silanes by hydrolysis to yield SiOSi bridges is already known in the art from the so-called "SIOPLAS" technology, which is reviewed, for example, in D. Munteanu, "Moisture Cross-Linkable Silane Grafted Polyolefins," *Polymer Science & engineering Reprints*, 49:283–287 (1983). However, unlike the SIOPLAS technology, the polymers of the present invention which are cross-linked by hydrolysis are not grafted to the matrix resin. Instead, the SiOR groups extend from polymer chains which form the silicone semi-interpenetrating polymer network, and these polymers and networks are unconnected to the matrix resin. Hence, the SiOSi bridges do not cross-link the matrix resin but only the silicone networks. Further, the secondary cross-linked IPNs of the present invention eliminate the necessity of using a peroxide catalyst which makes the present reactions cleaner, safer and more controllable.

The SiOR groups are preferably attached to side chains from vinyl polymers such as the triethoxysilyl-modified polybutadiene, disclosed in U.S. Pat. No. 4,714,739. Other vinyl functional polymeric silanes useful in the present invention will be evident to those skilled in the art. Also, other hydrolyzable groups besides ethoxy may be used, as noted above, although alkoxy groups are preferred.

The secondary cross-linking of the present invention is carried out by exposing the silicone semi-interpenetrating polymer networks to moist conditions, such as by immersing in water or steam. Since the cross-linking will generally give the compositions of the invention thermosetting properties, the composition should first be extruded, molded or otherwise shaped to its final desired form, and this form can then be subjected to the moist conditions.

Suitable moist conditions according to the invention include 60°–100° C. water or isbaric or superatmospheric steam for various periods of time in an inverse relationship. For example, one hour at 100° C., 15 minutes at 250° C., or several days at 50° C., may be suitable. As illustrated in Example I below, certain compositions of the invention may be sensitive to extreme conditions, such as high temperature steam. Hence, immersion in hot water seems to be the preferred method of hydrolysis.

Further, as shown in Examples II, it is preferred to first dry the silicone semi-interpenetrating networks and matrix polymer with heat prior to the water immersion. Preferably, predrying of the molded composition for about four hours at 100° C. prior to the water immersion appears to improve physical properties. The water immersion is preferably carried out in boiling water for about one hour. It is also preferable to dry the composition under heat after immersion, for example at 100° C. for another four hours.

The present invention will now be illustrated in further detail by reference to the following specific, non-limiting examples:

EXAMPLE I

Three different semi-IPN systems identified as A, B and C were compounded into nylon 12 (Emser Grilamid L-16) at loadings of 5 weight percent IPN, as indicated in Table I. PS numbers refer to commercially available products of Petrarch Systems Inc. of Bristol, Pa. The three IPNs were catalyzed with a platinum catalyst (7% chloroplantinic acid in andydrous ethanol solution) and test bars were injection molded. The physical properties of the test bars (dry as molded) are shown in Table II.

TABLE I

| IPN | Components | Wt. % |
|---|---|---|
| A | Nylon 12 (Emser Grilamid L-16) | 95 |
|  | Polydimethylsiloxane, vinyldimethyl terminated, 10,000 ctsk (PS 445) | 2.5 |
|  | (0.5–1.0%) methylhydro-(99.0–99.5%) dimethylsiloxane copolymer, 10,000 ctsk (PS 123.8) | 2.5 |
| B | Nylon 12 (Emser Grilamid L-16) | 95 |
|  | Polydimethylsiloxane, vinyldimethyl terminated, 1,000 ctsk (PS 443) | 4.75 |
|  | (30–35%) methylhydro-(65–70%) dimethylsiloxane copolymer, 25–30 ctsk (PS 123) | 0.25 |
| C | Nylon 12 (Emser Grilamid L-16) | 95 |
|  | Triethoxysilyl-modified polybutadiene, 125–175 ctsk (MW = 3500–4000) (PS 078.6) | 4.75 |
|  | (30–35%) methylhydro-(65–70%) dimethylsiloxane copolymer, 25–30 ctsk (PS 123) | 0.25 |
| Control | Nylon 12 (Emser Grilamid L-16) | 100 |

TABLE II

|  | Control | IPN-A | IPN-B | IPN-C |
|---|---|---|---|---|
| Tensile Strength* (psi) | 6168 | 5542 | 6461 | 7018 |
| Tensile Mod. (psi) | 152,400 | 160,428 | 179,899 | 185,530 |
| Elongation* | 15.5% | 14.7% | 14.2% | 16.1% |
| Flex Strength* (psi) | — | 4864 | 5568 | 5536 |
| Flex Mod. (psi) | — | 131,327 | 140,340 | 133,383 |

*Yield values by ASTM D638

TABLE III

|  | Control | IPN-A | IPN-B | IPN-C |
|---|---|---|---|---|
| Tensile Strength* (psi) | 5824 | 5257 | 5773 | 6419 |
| Tensile Modulus (psi) | 110,359 | 147,781 | 104,589 | 141,298 |
| Elongation | 17.8% | 17.3% | 17.9% | 22.9% |
| Flex Strength* (psi) | — | 4288 | 3776 | 4800 |
| Flex Modulus (psi) | — | 108,073 | 84,997 | 112,758 |

Test bars of the same compounds as prepared above were then exposed to one hour of steam at 250° F., 15 psi in an attempt to hydrolyze the ethoxy groups in IPN-C. The physical properties of the stream treated samples are listed in Table III. Although the properties are worse than those for the dry molded samples set forth in Table II, IPN-C still had superior properties to the other IPNs and to the unmodified nylon 12. However, this Example shows that severe steam treatment should be avoided in carrying out the hydrolysis crosslinking.

EXAMPLE II

A secondary cross-linked IPN (IPN-D as shown in Table IV) was compounded into nylon 12 (Emser Grilamid L-25) at a 10 weight percent loading. The solution of platinum catalyst was sprayed onto the resin, followed by melt-processing of the resin and injection molding of test bars. One set of bars was simply dried for four hours at 100° C. and the physical properties then measured. Another set of the bars was dried for four hours at 100° C., followed by immersion (soak) for one hour in boiling water, and finally dried for four hours at 100° C., after which the physical properties were measured. The physical properties of both sets of tests are set forth in Table V.

The physical properties shown in Table V show greatly increased tensile yield for both the dried and water-soaked IPN, while retaining the elonation yield, but without the loss of properties obtained in the steam treatment without predrying of Example I. In addition, samples made by this Example were extruded to fibers to make nylon felt mats or webbing for use as the support structure on paper-making machines to form and dry the wood pulp into paper. The nylon felt mats made with the secondary cross-linked IPNs of the present invention are believed to have improved physical properties and drainage of water from the felt mats.

The present invention may be embodied in other specific forms without departing from the spirit or essential attributes thereof and accordingly, reference should be made to the appended claims, rather than to the foregoing specification as indicating the scope of the invention.

TABLE IV

|  | Components | Wt. % |
|---|---|---|
| IPN D | Nylon 12 (Emser Grilamid L-25) | 90 |
|  | Triethoxysilyl-modified polybutadiene 125–175 ctsk (MW = 3500–4000) (PS 078.6) | 9 |
|  | (30–35%) methylhydro-(65–70%) dimethylsiloxane copolymer, 25–30 ctsk (PS 123) | 1 |
|  | chloroplatinic acid (7%) anhydrous ethanol (93%) | sprayed on resin |
| Control | Nylon 12 (Emser Grilamid L-25) | 100 |

TABLE V

|  | Control Dried 4 hr. at 100° C. | IPN-D Dried 4 hr. at 100° C. |
|---|---|---|
| Tensile yield (psi) | 5520 | 7351 |
| Elongation yield | 19% | 30% |
|  | Dried/1 hr. 100° C. $H_2O$ Soak/Dry | Dried/1 hr. 100° C. $H_2O$ Soak/Dry |
| Tensile yield (psi) | 3948 | 7360 |
| Elongation yield | 22% | 20% |

We claim:

1. A polymeric composition comprising a polymeric thermoplastic matrix and a cross-linked silicone semi-interpenetrating polymer network within said matrix, said network being formed by two distinct reactions, one reaction being the vulcanization within said matrix of a hydride group-containing silicone with a polymer containing at least one unsaturated group to form a semi-interpenetrating polymer network and the other reaction being the hydrolysis of SiOR groups on said polymer network wherein OR is an easily hydrolyzable group which in the presence of water is hydrolyzed, followed by condensation of silanol groups to form SiOSi cross-links between chains of said polymer network.

2. A composition according to claim 1 wherein said network comprises about 1 weight percent to about 60 weight percent of the total weight of the composition.

3. A composition according to claim 1 wherein said thermoplastic matrix is selected from the group consisting of polyamides, thermoplastic polyurethanes, biphenol A polycarbonates, styrene-ethylene-butylene-styrene block copolymers, polyacetals, polyolefins, styrene-butadiene copolymers, polyolefin elastomers, and polyamide-polyether elastomer base resins.

4. A composition according to claim 1 wherein said vulcanization occurs in the presence of a platinum catalyst.

5. A composition according to claim 1 wherein said unsaturated group comprises a vinyl group.

6. A composition according to claim 5 wherein said vulcanization forms a predominantly chain-extended structure wherein said vinyl-containing polymer contains from about two or about four vinyl groups and wherein said hydride group-containing silicone contains 1 to 2 times the equivalent of said vinyl-containing polymer with the ratio of said hydride groups to said vinyl groups being between about 1.2:1 and about 6:1.

7. A composition according to claim 5 wherein the vinyl-containing polymer has two vinyl groups in terminal positions.

8. A composition to claim 5 wherein said vulcanization forms a predominantly cross-linked structure wherein said vinyl-containing polymer contains from about two to about thirty vinyl groups and said hydride group-containing silicone contains from two to ten times the equivalent of said vinyl-containing polymer with the ratio of the hydride groups to the vinyl groups being between about 1.2:1 and about 6:1.

9. A composition according to claim 5 wherein the vinyl group is on a butadiene copolymer or polymer containing a significant proportion of poly 1,2-butadiene units.

10. A composition according to claim 5 wherein the vinyl group is on a triethoxysilyl modified poly 1,2-butadiene.

11. A method of preparing a cross-linked silicone semi-interpenetrating polymer network comprising vulcanizing a silicone component by the reaction of a hydride group-containing silicone and a polymer containing at least one unsaturated group with a polymeric thermoplastic matrix at least partially during thermoplastic melt-processing of said silicone component and said matrix, and cross-linking the newtwork formed by said vulcanization by hydrolyzing SiOR groups on said polymer network to allow condensation of silanol groups to form SiOSi cross-links between chains of said polymer network, wherein OR is a hydrolyzable group.

12. A method according to claim 11 wherein said unsaturated group is a vinyl group.

13. A method according to claim 11 wherein said vulcanization occurs in the presence of a platinum catalyst.

14. A method according to claim 11 wherein said thermoplastic matrix is selected from the group consisting of polyamides, thermoplastic polyurethanes, bisphenol A polycarbonates, styrene-ethylene-butylene-styrene block copolymers, styrene butadiene copolymers, polyolefins, polyacetals, polyolefin elastomers and polyamide-polyether elastomer base resins.

15. A method according to claim 12 wherein a predominantly chain-extended structure is formed by combining a hydride group-containing silicone and a vinyl group-containing polymer with the vinyl group-containing polymer having from about two or about four vinyl group and the hydride group-containing silicone containing 1 to 2 times the equivalent of the vinyl functionally with the ratio of the hydride groups to the vinyl groups being about 1.2:1 to 6:1, adding a catalyst and melt-processing the resultant mixture.

16. A method according to claim 11 wherein said melt-processing comprises extrusion.

17. A method according to claim 16 wherein said extrusion comprises forming a fibrous mat.

18. A method according to claim 11 wherein said hydrolysis reaction comprises immersion of the vulcanized network and thermoplastic matrix in hot water or stream.

19. A method according to claim 18 wherein said vulcanized network and thermoplastic matrix are dried by heating prior to said immersion.

20. A method according to claim 18 wherein said vulcanized network and thermoplastic matrix are dried by heating subsequent to said immersion.

21. A method according to claim 12 wherein a predominantly cross-linked structure is formed by separately extruding the vinyl group-containing polymer and hydride group-containing silicone into separate portons of said thermoplastic matrix, mixing the portions, adding a catalyst and melting the portions together so as to react the vinyl group-containing polymer and hydride group-containing silicone.

22. A method according to claim 12 wherein a predominantly cross-linked structure is formed by extruding together the vinyl group-containing polymer and hydride group-containing silicone into said thermoplastic matrix in the presence of a platinum catalyst and a fugitive inhibitor and melt-processing the resultant mixture.

23. A method according to claim 21 wherein the vinyl-group containing silicone contains from about two to about thirty vinyl groups and the hydride group-containing silicone contains from two to ten times the equivalent of the vinyl functionality with the ratio of the hydride groups to the vinyl groups being about 1.2:1 to 6:1.

24. A method according to claim 12 wherein the vinyl group is on a butadiene copolymer of copolymer containing a significant proportion of poly 1,2-butadiene units.

25. A method according to claim 12 wherein the vinyl group is on a triethoxysilyl modified poly 1,2-butadiene.

* * * * *

UNITED STATES PATENT AND TRADEMARK OFFICE
CERTIFICATE OF CORRECTION

PATENT NO. : 4,970,263
DATED : November 11, 1990
INVENTOR(S) : BARRY C. ARKLES et al.

It is certified that error appears in the above-identified patent and that said Letters Patent is hereby corrected as shown below:

Col. 2, line 68, after "silicone" (first occurrence), insert--contains--.

Col. 6, line 43, change "isbaric" to--isobaric--.

Col. 7, line 5, change "chloroplantinic" to--chloroplatinic--.

Col. 7, line 63, change "stream" to--steam--.

Col. 8, Table V, line 53, change "7351" to--7381--.

Col. 9, lines 15-16, change "biphenol" to--bisphenol--.

Col. 9, line 28, after "two" change "or" to--to--.

Col. 9, line 36, after "composition" insert--according--.

Col. 10, line 15, after "two" change "or" to--to--.

UNITED STATES PATENT AND TRADEMARK OFFICE
CERTIFICATE OF CORRECTION

PATENT NO. : 4,970,263

DATED : November 11, 1990

INVENTOR(S) : Barry C. Arkles et al.

It is certified that error appears in the above-identified patent and that said Letters Patent is hereby corrected as shown below:

Col. 10, lines 17-18, change "functionally" to --functionality--.

Col. 10, line 28, change "stream" to --steam--.

Signed and Sealed this

Twenty-first Day of July, 1992

Attest:

DOUGLAS B. COMER

*Attesting Officer*  *Acting Commissioner of Patents and Trademarks*